(12) United States Patent
Matze

(10) Patent No.: US 8,566,295 B2
(45) Date of Patent: Oct. 22, 2013

(54) SYSTEM AND METHOD FOR ELECTRONICALLY STORING ESSENTIAL DATA

(76) Inventor: John E. G. Matze, Poway, CA (US)

(*) Notice: Subject to any disclaimer, the term of this patent is extended or adjusted under 35 U.S.C. 154(b) by 141 days.

(21) Appl. No.: 13/149,434

(22) Filed: May 31, 2011

(65) Prior Publication Data

US 2012/0310901 A1    Dec. 6, 2012

(51) Int. Cl.
*G06F 17/00*    (2006.01)

(52) U.S. Cl.
USPC ............................ 707/698; 707/769; 713/190

(58) Field of Classification Search
USPC ................. 707/696–700, 741–747, 769–775; 713/189–191
See application file for complete search history.

(56) References Cited

U.S. PATENT DOCUMENTS

| | | | |
|---|---|---|---|
| 7,613,784 B2 | 11/2009 | Matze et al. | |
| 7,908,473 B2 | 3/2011 | Matze | |
| 2002/0053033 A1* | 5/2002 | Cooper et al. | 713/201 |
| 2002/0093527 A1* | 7/2002 | Sherlock et al. | 345/736 |
| 2004/0103315 A1* | 5/2004 | Cooper et al. | 713/201 |
| 2005/0138081 A1* | 6/2005 | Alshab et al. | 707/200 |
| 2005/0193269 A1* | 9/2005 | Haswell et al. | 714/38 |
| 2007/0053513 A1* | 3/2007 | Hoffberg | 380/201 |
| 2008/0177994 A1* | 7/2008 | Mayer | 713/2 |
| 2009/0170058 A1* | 7/2009 | Walker et al. | 434/323 |
| 2010/0070448 A1* | 3/2010 | Omoigui | 706/47 |
| 2010/0161996 A1 | 6/2010 | Whiting et al. | |
| 2010/0217771 A1* | 8/2010 | Nash | 707/769 |
| 2010/0241595 A1* | 9/2010 | Felsher | 705/400 |
| 2010/0250229 A1 | 9/2010 | Matze et al. | |
| 2010/0250896 A1 | 9/2010 | Matze | |
| 2010/0289627 A1* | 11/2010 | McAllister et al. | 340/10.42 |
| 2012/0177198 A1* | 7/2012 | Cabos | 380/270 |

* cited by examiner

Primary Examiner — Wilson Lee
(74) Attorney, Agent, or Firm — Nydegger & Associates

(57) ABSTRACT

A method for storing electronic data blocks at a storage facility uses a public database and a select database. Hash for each data block is evaluated at the facility to determine whether the data block is already stored at the facility. New data blocks are assigned a new address in the select database when encrypted with a customer key. Otherwise, they are assigned a new address in the public database by default. Duplicate data blocks are assigned a previously established address for the data block in either the public or select database. All addresses are then sent to the customer location for file integrity and only the content of new data blocks need to be sent to the storage facility (i.e. no need for duplicates).

3 Claims, 1 Drawing Sheet

SYSTEM AND METHOD FOR ELECTRONICALLY STORING ESSENTIAL DATA

FIELD OF THE INVENTION

The present invention pertains generally to data storage facilities. More particularly, the present invention pertains to storage facilities that evaluate hash functions to determine whether the data to be stored is already stored at the facility. The present invention is particularly, but not exclusively, useful as a system and method for maximizing the storage capacity of a facility by simply discarding selected data that is already in storage.

BACKGROUND OF THE INVENTION

From a physical standpoint, the capacity of a facility for storing electronic data is finite. Stated differently, there are only so many places to store data at a storage facility. With this in mind, it has happened that despite advances in techniques for storing electronic data (i.e. data compression), there is still a high demand for data storage. In the event, depending somewhat on scale, the cost of storing electronic data can be considerable.

It is well-known that hash functions, more commonly referred to simply as "hash," can be of considerable use in many circumstances for handling electronic data. For example, it is known that hash can be used to effectively hasten data retrieval by facilitating look-up table activities or performing data comparison tasks. In particular, it is known that "hash" can be effectively used to identify the data content of a block of electronic data.

For many commercial and governmental activities it is typical for electronic files to be very extensive. Consequently, it is a fairly common practice to break electronic files into smaller data blocks. An obvious benefit here is that when broken into data blocks, electronic files can be more effectively handled. As a practical matter, it can easily happen that within a particular electronic file, or even more likely within a group of files, there may be many duplicate data blocks. In any event, all of the data blocks need to be identifiable and accounted for. Hash (i.e. hash functions) are, therefore, valuable tools for use in identifying the data content of a data block. Importantly, this identification can be accomplished without the need to resolve, and/or decrypt, the entire content of the data block. Specifically, after being hashed, it happens that the data blocks can be compressed and/or encrypted without altering the hash in any way. Heretofore, standard practice has been to store all these data blocks and their hash, without further processing.

In light of the above, it is an object of the present invention to provide a system and method for storing only essential data from an electronic data file at a storage facility. Another object of the present invention is to provide a system and method for storing electronic data blocks at a storage facility when the data block is not already stored at the facility. Still another object of the present invention is to provide a system and method for storing data blocks at a storage facility that is easy to implement, is simple to use and is comparatively cost effective.

SUMMARY OF THE INVENTION

A system and method are provided for storing electronic data blocks when the data blocks are sent from a customer location to a storage facility. In accordance with the present invention, and according to instructions from the customer location, the storage facility uses both a public database and a plurality of select databases for storing data blocks. How each data block will be handled at the storage facility depends on whether the data block is "new," or is a "duplicate."

To determine whether a data block is a "new" data block or is a "duplicate" data block, hash for each data block is individually evaluated at the storage facility. Based on this determination, a new address at the facility is assigned for new data blocks, and an established address is assigned for "duplicate" data blocks (i.e. data blocks that are already known at the facility). Further, a new data block is assigned a new address in a select database when it has been encrypted at the customer location with a customer key. Otherwise, the new data block is assigned a new address in the public database, by default. As noted above, all data blocks that are determined by their hash to be "duplicate" data blocks are assigned the previously established address for such data blocks. This is done regardless whether the established address is in the public database or in a select database. Once assigned, all addresses are then sent to the customer location, and they are thereafter considered by the storage facility as being an established address for subsequent retrieval of the data block.

For storage purposes, only data blocks that have been determined to be "new" data blocks need to be sent from the customer location to the storage facility. On the other hand, when a data block already has a "duplicate" at the storage facility, it can be discarded.

In an operation of the present invention, when an electronic data file is selected for storage at the storage facility, it is first broken into data blocks at the customer location. Hash is then generated for each data block. The data block can then be compressed and encrypted. As envisioned for the present invention, encryption of the data block is accomplished using either a service key that is provided by the storage facility or a customer key that is constructed at the customer location. In the latter case, the customer key is unknown to the storage facility. Hash for the data block(s) to be stored is then sent to the storage facility.

At the storage facility, the hash is evaluated to determine whether its data block is "new" or is "duplicated." If the data block is "duplicated," the data block is assigned a previously established address at the storage facility. Importantly, this established address will be the same address as was previously used for a duplicate data block, regardless which database the established address is in. On the other hand, if the data block is "new," a new address is established for the data block at the facility. Further, if the new data block is encrypted with a customer key, and the hash does not exist in the public database, the storage facility considers this encryption to be instructions for storing the new data block in the select database. By default, when a new data block is not encrypted, or is encrypted with a service key, it is considered to be well-known, and the storage facility will store the data block at a new address in the public database. Accordingly, this use of a new address in either the select database or the public database depends solely on the "hash" calculated at the customer location. Once a "new" address is assigned for a data block at the storage facility, it then becomes an "established" address for a "duplicate" data block. Importantly, as new data blocks are added to the public database, the public database effectively becomes more intelligent and can thereby more efficiently identify "duplicated" data blocks.

After the hash has been evaluated, and after addresses have been assigned for data blocks as set forth above, the customer location is then informed of all addresses for all of the various data blocks in an electronic file. At the same time, the customer location is also instructed by the storage facility to send only new data block(s) in the electronic file to the storage facility for storage based on the previously assigned address. The storage facility then simply waits for retrieval instructions from the customer location. Upon receipt of such instructions, the storage facility scans "hashes" in both the "public" database and the "select" database to identify compliant data block(s). The customer location then effectively reconstructs the electronic file from the compliant data block(s) that are returned from the storage facility.

At the storage facility, as new data arrives in the public database, new "well-known" hashes will accumulate. A process will occasionally check all of the select databases for new "hash" values entered into the public database. If these "new" data blocks exist in any select database, the data may be removed from the select database as the data block is now "well-known." This allows additional storage savings as new public data may be removed from the select database because it's contents are now known and the customer key of the public data becomes invalid.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
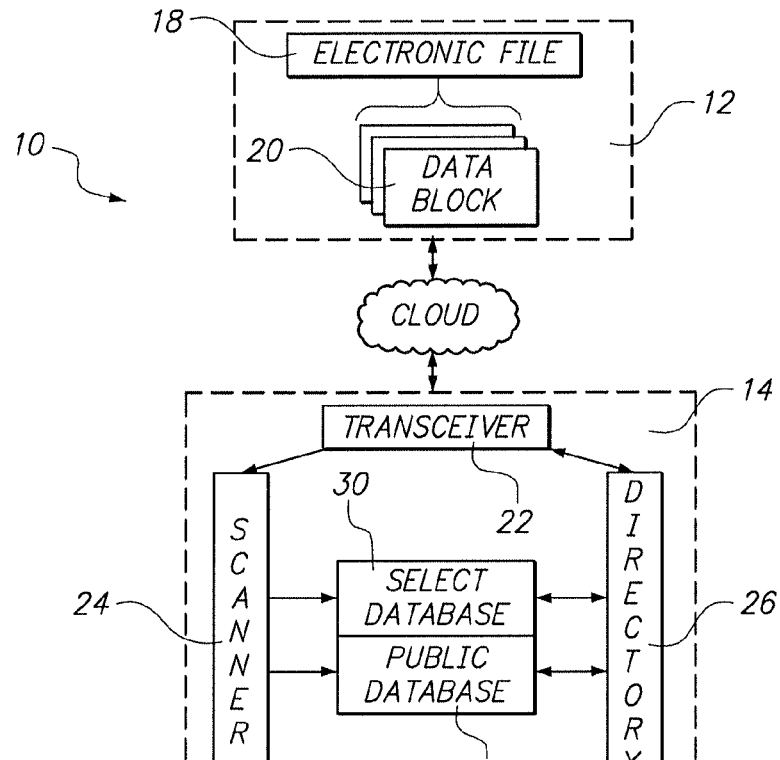
FIG. 1 is a schematic of a system for storing electronic data in accordance with the present invention.

Referring initially to FIG. 1, a system in accordance with the present invention is shown and is generally designated 10. As shown, the system 10 includes a customer location 12 and a storage facility 14 that are in communication with each other via the cloud 16. In actuality, the communication medium between the customer location 12 and the storage facility 14 can be of any type well-known in the pertinent art, to include the internet, fiber optics, and land line. Regardless of the communication medium used, it is the purpose of the system 10 to provide for the electronic storage of an electronic data file 18. The electronic data file 18 shown in FIG. 1 is only exemplary, as there may be many such electronic data files 18 at a customer location 12. Moreover, as will be appreciated by the skilled artisan, the electronic data file 18 may be very extensive and thus, for practical reasons, such an electronic data file 18 is typically broken into data blocks 20.

Still referring to FIG. 1, it will be seen that the storage facility 14 of the system 10 includes a transceiver 22 that is in internal communication with both a scanner 24 and a directory 26. Further, both the scanner 24 and the directory 26 are in direct internal communication with a public database 28 and with a select database 30. For purposes of the present invention, these internal communication links can be of any type well-known in the art, such as wire or wireless.

At the customer location 12, as indicated above, an electronic data file 18 is typically broken into data blocks 20 before the electronic data file 18 is to be stored at the storage facility 14. After the electronic data file 18 has been broken in data blocks 20, each data block 20 can then be hashed. Also, each data block 20, less its "hash," can also be compressed and encrypted, as desired. Preferably, all three tasks (i.e. hashing, compression and encryption) will be performed at the customer location 12. Specifically, insofar as encryption is concerned, the customer location 12 can basically select between the use of a customer key or a service key. The essential difference here being that the customer key is constructed at the customer location 12, and it is therefore unknown to the storage facility 14. On the other hand, the service key is provided by the storage facility 14 for use at any customer location 12 and, thus, is intended to provide general protection for data blocks 20 belonging to any user of the storage facility 14. In the event, when the customer location 12 chooses to store an electronic data file 18 at the storage facility 14, the electronic data file 18 is prepared for storage. In general, this preparation entails the steps of: a) breaking the electronic data file 18 into data blocks 20; b) creating hash for each data block 20; c) compressing each data block 20; and d) encrypting each data block 20. At this point, and as indicated at action indicator 32 in FIG. 2, after the electronic data file 18 has been prepared for storage, only hash for the various data blocks 20 are initially sent to the storage facility 14.

Figure 2:
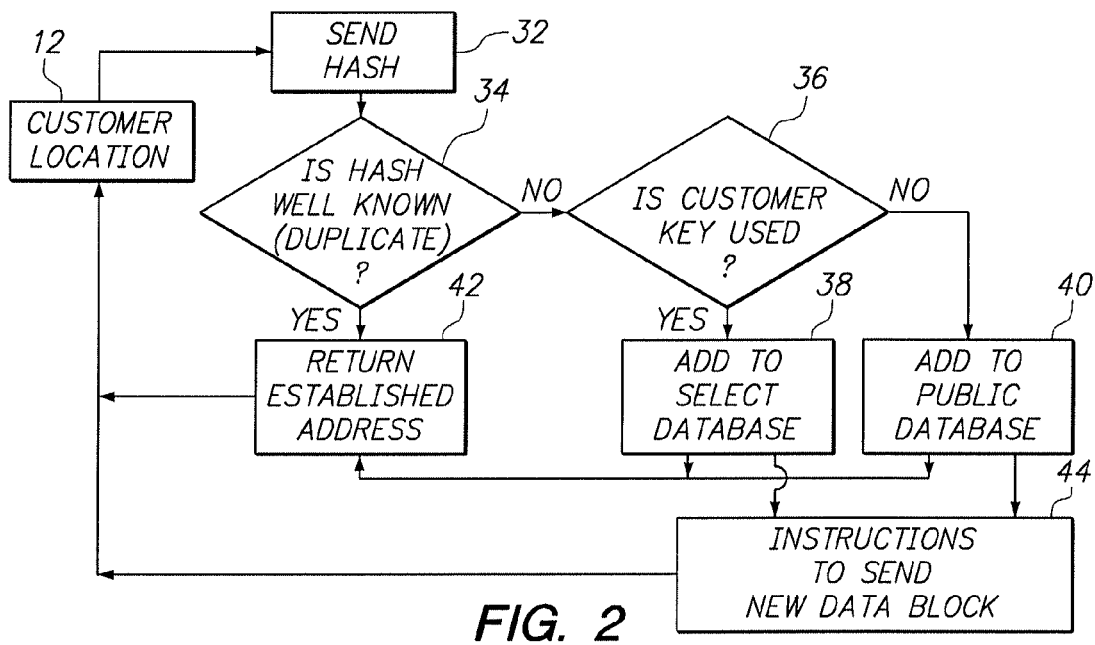
FIG. 2 is a flow chart of tasks to be performed at a storage facility for the storage of electronic data in accordance with the present invention.

Referring now to FIG. 2, the actions taken and the inquiries made by the storage facility 14 for storing data blocks 20 of the electronic data file 18 are shown. In detail, upon receipt of hash for a particular data block 20 at the storage facility 14, inquiry indicator 34 shows that the first decision to be made concerns whether the data block 20 is "new" at the storage facility 14, or is otherwise "duplicated" (i.e. it is the duplicate of a data block 20 that is already stored). A data block is considered "new" if the "hash" of the data block does not exist in the public or select databases. If the data block 20 is "new," inquiry indicator 36 shows that the next decision to be made concerns whether the data block 20 is encoded with a customer key. If so, action indicator 38 has the storage facility 14 create a new address for the data block 20 in the select database 30. If not, action indicator 40 has the storage facility 14 create a new address for the data block 20 in the public database 28. In both instances, once a new address has been assigned for the data block 20, it will thereafter be essentially treated as an established address. Going back to inquiry indicator 34, if the data block 20 was originally determined to be "duplicate," it is assigned the previously used, established address, in the appropriate database 28 or 30 at the storage facility 14.

Action indicator 42 in FIG. 2 shows that after all of the data blocks 20 in an electronic data file 18 have established addresses, these addresses are returned to the customer location 12 for file integrity. Action indicator 44 in FIG. 2, however, shows that the content of only those blocks 20 that arrived at the storage facility 14 as "new" data blocks are to be sent to the storage facility 14 for storage. With this qualification, the duplication of data blocks 20 at the facility 14 is avoided. Nevertheless, upon receiving instructions from the customer location 12 for the retrieval and return of an electronic data file 18, the storage facility 14 has retained the content of all required data blocks 20. The electronic data file 18 can then be reconstructed, in its entirety, at the customer location 12.

At the storage facility 14, as new data blocks 20 arrive in the public database 28, new "well-known" hashes will accumulate. A process will occasionally check all of the select databases 30 for new "hash" values entered into the public database 28. If these "new" data blocks 20 exist in any select database 30, the duplicate data block 20 may be removed as the data block 20 is now "well-known." As envisioned for the system 10, this allows additional storage savings as new public data (i.e. "well-known" data blocks 20) may be removed from the select database 30 because it's contents are now known.

While the particular System and Method for Electronically Storing Essential Data as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An electronic storage facility for storing essential data from an electronic file, wherein the electronic file is broken into data blocks and each data block has a hash, the storage facility comprising:

a scanner for receiving a separate hash for each said data block from the customer location to determine whether the hash is for an already well-known data block at the storage facility having a previously established address or a new data block, wherein said data block is considered to be well-known when it is not encrypted, or is encrypted with a service key;

a select database having a plurality of addresses for storing said new data blocks at an address in the select database when appropriately instructed by the customer location;

a public database having a plurality of addresses for storing all of said well-known data blocks, and new data blocks when defaulted from the select database; and a directory for informing the customer location of the address of each said data block and for instructing the customer location to send only new data blocks for storage at the storage facility.

2. An electronic storage facility as recited in claim 1 wherein each data block can be encrypted with a key selected from a group comprising a service key provided by the storage facility and a customer key constructed by the customer location.

3. An electronic storage facility as recited in claim 1 further comprising a transceiver for communicating with the customer location over the internet.

* * * * *